UNITED STATES PATENT OFFICE.

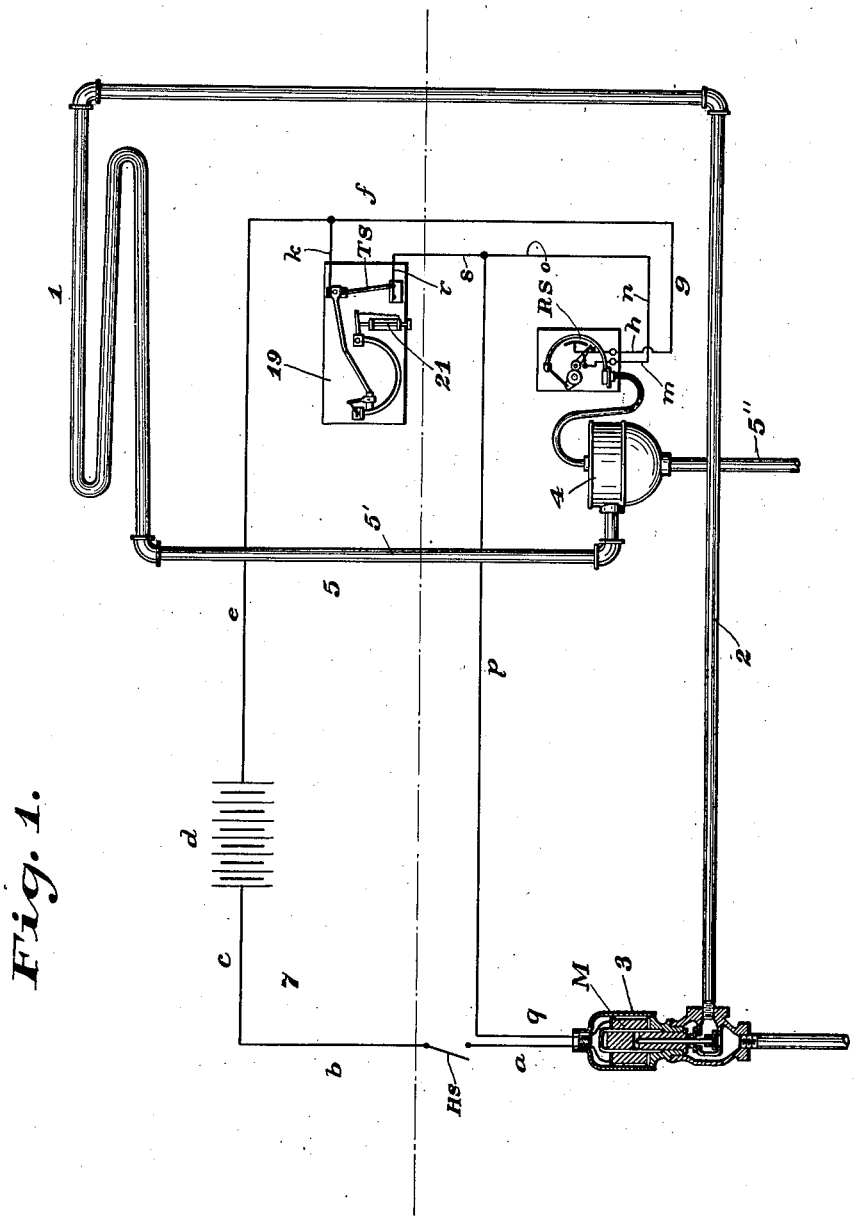

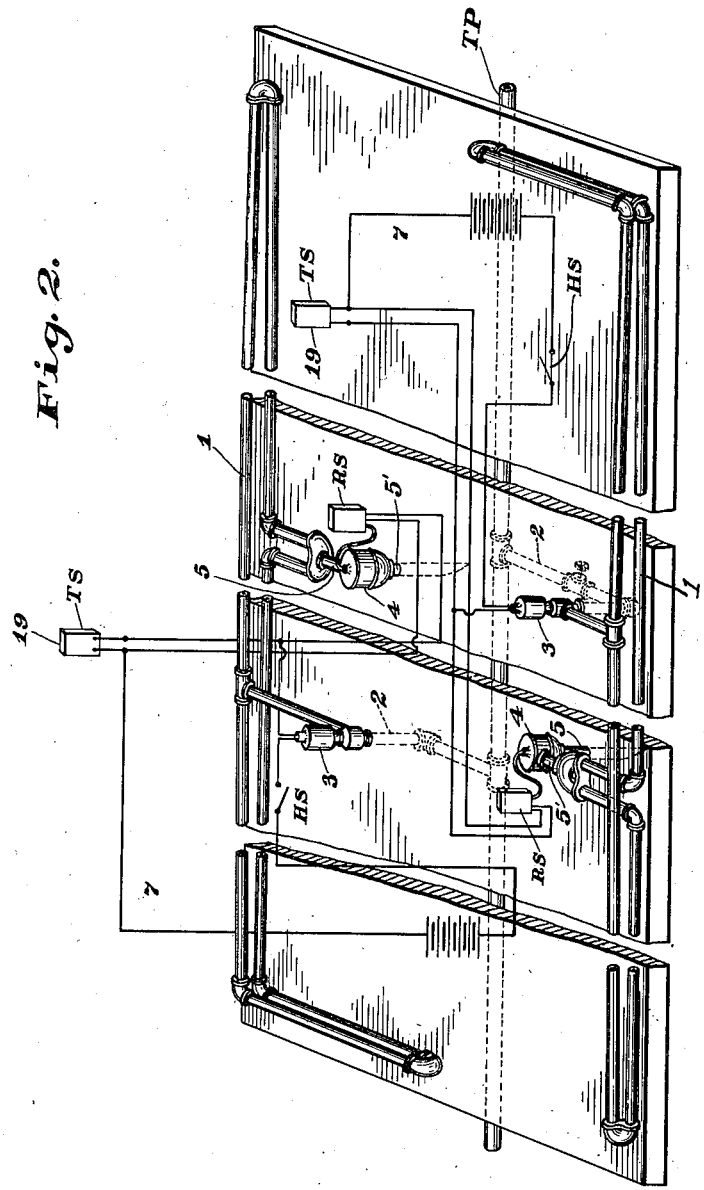

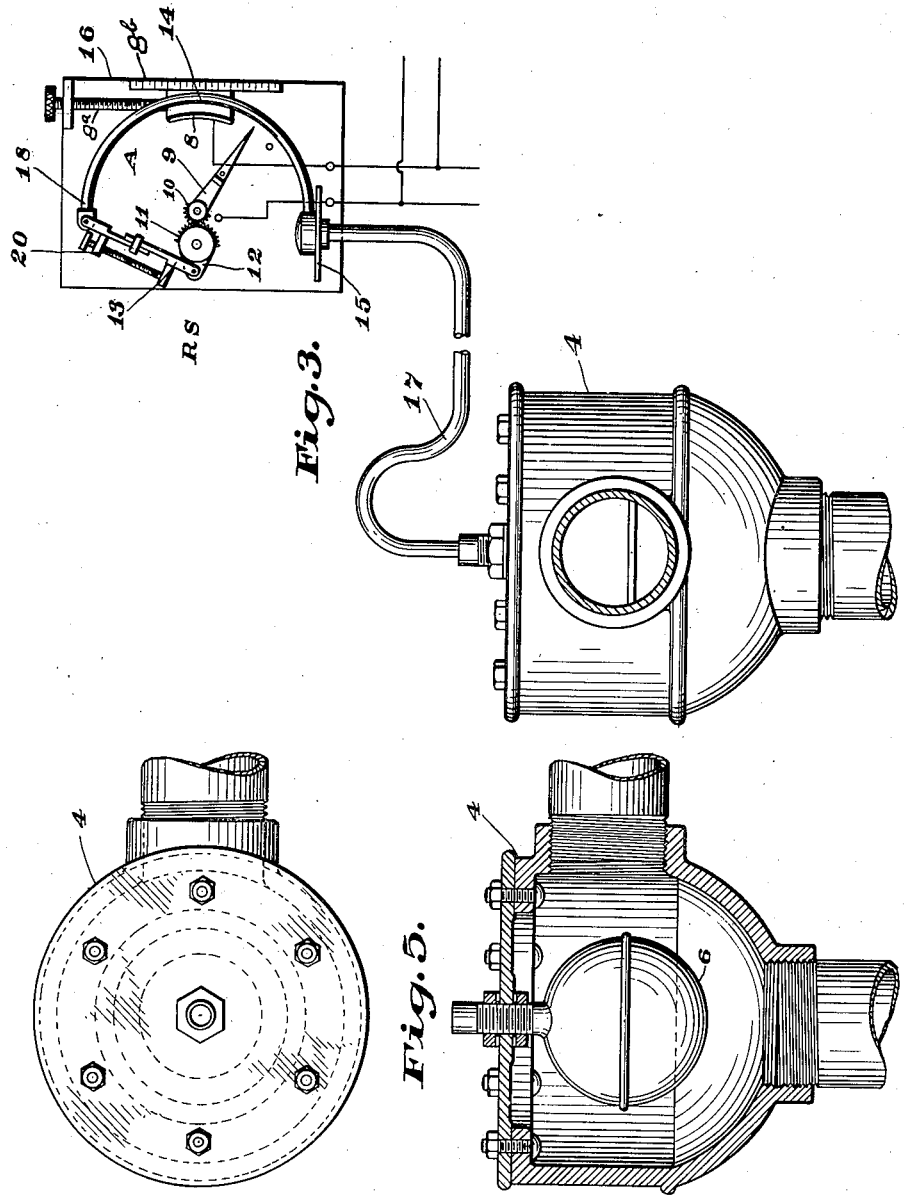

CARL SCHWARTZ, OF NEW ROCHELLE, NEW YORK, ASSIGNOR TO VAPOR CAR HEATING COMPANY, INC., OF NEW YORK, N. Y., A CORPORATION OF NEW YORK.

HEATING SYSTEM.

1,369,712.  Specification of Letters Patent.  Patented Feb. 22, 1921.

Application filed December 18, 1916. Serial No. 137,566.

*To all whom it may concern:*

Be it known that I, CARL SCHWARTZ, a subject of the Emperor of Germany, (who has forsworn his allegiance to said country and has taken an oath declaring his intention of becoming a citizen of the United States,) and a resident of New Rochelle, county of Westchester, and State of New York, have invented certain new and useful Improvements in Heating Systems, (Case C,) of which the following is a specification.

The invention relates to steam heating systems and particularly systems which are employed for the heating of cars.

The object of the invention is to construct a system whereby a comparatively uniform temperature within the car or compartment to be heated will be maintained, even though the system is being employed when the weather is comparatively mild or moderate, or when the heating system is employed when the weather is comparatively cold or severe. This is accomplished by regulating the flow of steam to the system.

An important feature of the present invention is to construct the system so that a desired temperature within the interior of the car or compartment can be maintained even though the temperature of the air, vapor, or steam, or mixtures thereof within the system is comparatively low.

As illustrating a manner in which the invention may be realized reference is made to the drawings forming a part of this specification, in which drawings, Figure 1 is a diagrammatic view of a heating system embodying the invention.

Fig. 2 is a perspective view illustrating the application of the heating system shown in Fig. 1 to a railroad car. In Fig. 2, however, there is shown a plurality of the systems shown in Fig. 1.

Fig. 3 is a view illustrating a combined switch and regulator which regulator controls the operation of the switch.

Figs. 4 and 5 are, respectively, plan and vertical sectional views of the regulator shown in Fig. 3.

The heating system shown in Fig. 1 comprises a radiator 1 which is supplied with steam conducted to it by means of a supply pipe 2 having therein an electrically controlled valve 3, preferably of the magnetically operating type, as shown. This valve controls the opening and closing of the passageway in the supply pipe, or in other words controls the flow of steam through said pipe to said radiator. A regulator 4
is provided. This regulator is in communication with the radiator through the medium of a discharge pipe 5 which comprises short pipes 5′ and 5″, the pipe 5′ leading from the radiator to the regulator and the pipe 5″ leading from the regulator to the atmosphere.

This regulator is clearly shown in Figs. 3, 4 and 5 and from an inspection of the last-mentioned figure it will be clear there
is a casing 6 arranged within the regulator
and in such a manner that the casing is subjected to any air, vapor, or steam, or mixtures thereof within the regulator or flowing through the regulator, as when on
its way from the radiator. The electrically
controlled or magnetically operating valve 3 is under the control of an electric circuit 7 which comprises line *a*, hand-switch HS, lines *b*, *c*, source of electric energy *d*, lines *e*,
*f*, *g*, *h*, regulator-switch RS, lines *m*, *n*, *o*, *p* and *q*, and magnet M. There is also in this circuit a thermostatic-switch TS having one terminal of the switch connected by line *k* to the line *f* and the other terminal of the
switch connected by lines *r*, *s*, to the line *p*.
When the system is in operation the hand-switch HS must be closed and when either the regulator-switch RS or the thermostatic-switch TS is closed the electric circuit will
be closed thus energizing the magnet M of
the valve 3 and causing a closing of said valve whereby the supply of steam through the pipe 2 to the radiator 1 will be cut off.

The regulator-switch RS is fully shown
in Fig. 3 and comprises a stationary contact
8 and a movable contact 9. This movable contact is positioned by actuating mechanism A which comprises any suitable mechanical elements such, for instance, as
gears 10 and 11, a crank arm 12, link 13 and a Bourdon tube 14 which is supported or connected by a member 15 to a frame 16 carrying this switch and its actuating mechanism. The Bourdon tube 14 is con-
nected by means of a connecting tube 17 to the casing 6 that is within the regulator 4. The casing 6 and the connecting tube 17 contain a fluid, such as mercury or gas, that is susceptible to temperature variations and
the connecting tube 17 is in communication with the interior of the Bourdon tube 14. Such being the case any expansion or contraction of the fluid contained within the the casing 6 will effect a movement of the free end 18 of the Bourdon tube 14 thus causing the movable contact 9 to be correspondingly positioned. An increase of temperature, of the air, vapor, or steam, or mixtures thereof passing through the regulator, will of course cause an expansion of the fluid contained in the casing and will cause a movement of the contact member 9 to a position where it will engage the stationary contact 8, thus causing a closing of the electric circuit 7 and an actuation of the valve 3, it being understood, as previously stated, that the hand-switch HS is at this time closed.

Within the compartment there is also provided a thermostat 19 which is suitably constructed so as to actuate the thermostatic-switch TS when the temperature within the compartment exceeds or falls below a predetermined degree. When the thermostat within the compartment operates due to a rise of temperature it closes the thermostatic-switch TS thus completing the circuit 7, if it has not been already completed by the regulator-switch RS, and causes a closing of the valve 3 so as to cut off the supply of heating medium, to wit, the steam to the radiator.

The parts shown in Fig. 2 are similar in their function and mode of operation to the parts described in connection with Fig. 1 and have been correspondingly numbered and therefore a further description thereof at this time is unnecessary. In Fig. 2 there is a train pipe TP from which there extends the branch or supply pipes 2 that lead to the radiators. It will be manifest, however, that there are two electrically controlled or magnetically operating valves 3, two radiators 1, two regulators 4, two electric circuits 7 which have two hand-switches HS, two regulator-switches RS and two thermostatic-switches TS. For each of the thermostatic-switches TS there is of course a corresponding thermostat.

In a system such as is shown in Figs. 1 and 2 of the drawings with a regulator such as illustrated, it will be observed that the position of the movable contact 9 relative to a stationary contact member is directly dependent upon the temperature of the air, vapor or steam, or mixtures thereof or whatever else there may be, within the regulator 4 and that the movement is practically wholly dependent upon the change in volume of the fluid within the casing 6 and the connecting pipe 17. In order to position or adjust the movable contact 9 relatively to the stationary contact 8 as, for instance, to change this to regulate the system when the temperature is moderate, after the system has been employed during colder weather, an adjusting means 20 can be employed, for example, for the purpose of changing the effective length of the link 13. This adjusting means might be employed at other places in the actuating mechanism A which comprises the mechanical elements between the movable contact 9 and the supports for the Bourdon tube 14, or the support 15 itself might be made adjustable if such were found desirable. For instance an adjusting mechanism, somewhat similar to adjusting mechanism 21 indicated as constituting a part of the thermostat 19 shown in Fig. 1, might be employed, or the stationary contact 8 might be adjusted, as by a screw $8^a$, relative to the scale portion $8^b$. It will be observed that the regulator having the construction shown in Figs. 3, 4 and 5 is sensitive to all changes of temperature conditions within the regulator, when said regulator is working at comparatively low temperatures as well as when working at comparatively high temperatures.

While the regulator 4 has been shown as attached to the discharge pipe leading from the radiator still it is manifest that it could be employed with any other part of the radiator system; for instance it could be attached to the supply pipe leading to the radiator, if such were desired. Or, it might even be embodied in or constitute a part of the radiator. Forms of thermostats other than that shown might be employed for moving the thermostatic-switch TS and a detail description of this thermostat is believed to be unnecessary.

The two separate automatic regulating devices previously described, to wit, the devices which respectively include the regulator switch RS and the thermostatic switch TS, are provided First, in order that when a predetermined temperature at the discharge end of the heating system is reached the steam supply to the radiator will be automatically interrupted. This is accomplished by the completion of the electric circuit controlled by the switch RS and which circuit energizes the magnet M of the valve 3 thus causing a closing of said valve whereby the supply of steam to the pipe 2 through the radiator will be cut off. The operation of the switch RS is caused by the expansion of the fluid that is within the casing 6 within the regulator 4 and the bent tube 17 leading to the Bourdon tube 14 of the regulating device of the regulator switch RS. The operation of the switch RS is modified to a certain extent by the condition of the fluid within the bent tube leading from the regulator, which tube is exposed to temperature conditions exterior of the regulator.

Second, in order that when a predetermined temperature within the room or compartment has been reached the steam supply to the radiator will be automatically cut off by the completion of the electric circuit due to the closing of the switch TS and within which circuit the magnet M is included. The completion of this circuit energizes the magnet M and causes a closing of the supply valve 3 thus shutting off the supply of steam to the radiator.

The improvements herein set forth are not limited to the precise construction and arrangement shown and described for they may be embodied in various forms and modifications without departing from the spirit and scope of the invention.

What I claim and desire to secure by Letters Patent of the United States is:

1. A steam heating system of the class described comprising in combination a radiator, a supply pipe communicating therewith, an electrically controlled valve for regulating the flow of steam through said supply pipe, a regulator in communication with said radiator, a switch controlling said valve and comprising a movable contact member actuated by means of mechanism connected to a Bourdon tube, a casing for said regulator connected by means of a tube to said Bourdon tube, said casing and connecting tube containing a fluid susceptible to temperature variations whereby the movable contact will be positioned dependent upon said fluid, the casing containing said fluid being located in such a position that air, vapor, or steam, or mixtures thereof, engage said casing.

2. A heating system comprising in combination a train pipe, a radiator, a supply pipe leading from said train pipe to said radiator, a magnetically operating valve controlling said supply pipe, a regulator in communication with said radiator, an electric circuit which controls the opening and closing of said valve, a switch for controlling said valve which switch has a movable contact and actuating mechanism therefor, said regulator having a casing connected by means of a tube to said actuating mechanism and containing fluid susceptible to temperature variations whereby the movable contact member of the switch is dependent for its operation upon said fluid.

3. A car heating system of the class described comprising in combination a train pipe, a radiator, a supply pipe leading from said train pipe to said radiator for conducting steam to the latter, a magnetically operating valve for controlling the opening and closing of the passageway to said supply pipe, a regulator, a discharge pipe leading from said radiator to said regulator and from the regulator to the atmosphere, said regulator having therein and subject to the air, vapor, or steam, or mixtures thereof, passing through said regulator, a casing for containing fluid, an electric circuit for controlling the opening and closing of said magnetically operating valve, said circuit having a switch which has a movable contact and mechanism for moving said contact, a tube leading from said casing to said mechanism, and a fluid susceptible to temperature variations within said casing and tube whereby the movable contact of the switch will be dependent for its operation upon the expansion and contraction of said fluid.

4. A heating system comprising in combination a train pipe, a radiator, a supply pipe leading from said train pipe to said radiator, said supply pipe having a magnetic valve, a regulator in communication with such radiator, an electric circuit which controls the energizing or deënergizing of the magnet of said valve, a switch for opening and closing said circuit which switch has a movable contact and actuating mechanism therefor, said regulator having a casing connected by means of a tube to said actuating mechanism and containing fluid susceptible to temperature variations whereby the movable contact member of the switch is dependent for its operation upon said fluid, said actuating mechanism having members which can be adjustably secured relatively to each other in such a manner that the movable contact can be adjusted.

5. A car heating system of the class described comprising in combination a train pipe, a radiator, a supply pipe leading from said train pipe to said radiator and having an electrically controlled valve for opening and closing the passageway thereof, a regulator having therein a casing comprising fluid susceptible to temperature variations, means for conducting air, vapor or steam, or mixtures thereof, from said radiator to the interior of said regulator, and an electric circuit for controlling the opening and closing of said valve, said circuit having a switch for opening and closing the same which has a movable contact actuated by mechanism located between the regulator and the movable contact, which mechanism is dependent for its operation upon the expansion and contraction of the fluid within said casing, said mechanism also being provided with means for adjustably positioning said movable contact.

6. A car heating system of the class described comprising in combination a train pipe, a radiator, a supply pipe leading from said train pipe to said radiator for conducting steam to the latter, a magnetic valve for controlling the opening and closing of the passageway of said supply pipe, a regulator, a discharge pipe leading from said radiator to said regulator and from said regulator to the atmosphere, said regulator having therein and subject to the air, vapor or steam, or mixtures thereof, passing through the regulator, a casing containing fluid, an electric circuit for controlling the opening and closing of said valve, said circuit having a switch which has a stationary contact means, a movable contact and actuating mechanism for moving the latter, a tube containing fluid leading from said casing to said actuating mechanism, said actuating mechanism being provided with adjusting means whereby the movable contact can be adjusted relatively to the stationary contact means.

This specification signed and witnessed this 14th day of December, A. D. 1916.

CARL SCHWARTZ.

In the presence of—
H. N. DRAKE,
D. T. OAKLEY.